United States Patent
Loranger

(10) Patent No.: US 9,156,391 B2
(45) Date of Patent: Oct. 13, 2015

(54) COLLAPSIBLE RIGID SHELTER FOR MOUNTING ON A TRUCK BED

(71) Applicant: Fabian Loranger, Fort Saskatchewan (CA)

(72) Inventor: Fabian Loranger, Fort Saskatchewan (CA)

(73) Assignee: TURTLESHEL PRODUCTS INC., Fort Saskachewan, Alberta (CA)

( * ) Notice: Subject to any disclaimer, the term of this patent is extended or adjusted under 35 U.S.C. 154(b) by 95 days.

(21) Appl. No.: 13/919,683

(22) Filed: Jun. 17, 2013

(65) Prior Publication Data

US 2014/0367991 A1 Dec. 18, 2014

(51) Int. Cl.
*B60P 3/34* (2006.01)

(52) U.S. Cl.
CPC ..................... *B60P 3/341* (2013.01)

(58) Field of Classification Search
CPC .................... B60P 3/341; B60P 3/34
USPC .............. 296/165, 159, 156, 164, 174, 26.11, 296/100.1, 37.6; 135/88.13
See application file for complete search history.

(56) References Cited

U.S. PATENT DOCUMENTS

| | | | |
|---|---|---|---|
| 1,466,224 A | 8/1923 | Hans | |
| 1,477,111 A | 12/1923 | Eaton | |
| 1,568,895 A | 1/1926 | Lyons | |
| 1,587,390 A | 3/1926 | Brown | |
| 3,175,857 A | 3/1965 | Lewis | |
| 3,367,347 A | 2/1968 | Smith | |
| 3,466,082 A | 9/1969 | Branch | |
| 3,507,535 A | 4/1970 | Wallace | |
| 3,737,190 A | 6/1973 | Smith et al. | |
| 3,749,439 A | 7/1973 | Ferguson | |
| 4,065,166 A * | 12/1977 | Shoemaker | 296/159 |
| 4,088,363 A | 5/1978 | Palmer | |
| 4,165,117 A | 8/1979 | Kaiser | |
| 4,294,484 A | 10/1981 | Robertson | |
| 4,332,265 A | 6/1982 | Baker | |
| 4,420,182 A | 12/1983 | Kaneshiro | |
| 4,566,729 A | 1/1986 | Magnino | |
| D297,424 S | 8/1988 | Norris, III | |
| 4,807,924 A | 2/1989 | Kottke | |
| 4,943,108 A | 7/1990 | Turnbull | |
| 5,299,849 A | 4/1994 | Cook et al. | |
| 5,704,677 A | 1/1998 | Steury et al. | |
| 5,769,485 A | 6/1998 | Bontrager et al. | |
| 5,988,195 A | 11/1999 | Kaestner et al. | |
| 6,170,502 B1 | 1/2001 | Pullen | |

(Continued)

OTHER PUBLICATIONS

Livin' Lite. Quicksilver Truck Camper Review. Roaming Times. http://www.roamingtimes.com/rvreports/2/quicksilver-truck-camper.aspx, 1999-2010.

*Primary Examiner* — Joseph D Pape
*Assistant Examiner* — Dana Ivey
(74) *Attorney, Agent, or Firm* — Bennett Jones LLP

(57) ABSTRACT

The present invention discloses a collapsible rigid shelter for mounting on a truck bed. The shelter includes a floor with a pair of floor extensions, a roof shell, a collapsible roof support and a plurality of rigid wall panels. In the transport configuration, the rigid wall panels overlap the floor. The shelter may be transformed to the deployed configuration by using to collapsible roof support to elevate the roof shell, sliding the floor extensions laterally away from each other, and moving the wall panels to extend between from either the floor or one of the floor extensions to the roof shell, and thereby collectively form an enclosure when the shelter is in the deployed configuration.

7 Claims, 18 Drawing Sheets

(56) References Cited

U.S. PATENT DOCUMENTS

| | | |
|---|---|---|
| 6,179,368 B1 * | 1/2001 | Karlsson .................. 296/161 |
| 6,217,106 B1 | 4/2001 | Reckner, Jr. |
| 6,283,536 B1 | 9/2001 | Muzyka et al. |
| 6,439,647 B1 | 8/2002 | Baldwin |
| 6,443,516 B2 | 9/2002 | Lambright |
| 6,604,777 B2 | 8/2003 | Neville |
| 6,663,167 B2 * | 12/2003 | Phillips et al. ............ 296/165 |
| 6,679,542 B1 | 1/2004 | Semotuk |
| 6,871,896 B1 * | 3/2005 | Owen .................... 296/26.11 |
| 6,932,418 B1 | 8/2005 | Connell |
| 7,404,590 B2 | 7/2008 | Loranger |
| D583,746 S | 12/2008 | Napieraj |
| 7,942,464 B2 | 5/2011 | Schmidt |
| 8,230,870 B2 * | 7/2012 | Horejsh .................. 135/88.13 |
| 2002/0163221 A1 | 11/2002 | Smith |

\* cited by examiner

COLLAPSIBLE RIGID SHELTER FOR MOUNTING ON A TRUCK BED

FIELD OF THE INVENTION

The present invention relates to a collapsible rigid shelter for mounting on a truck bed.

BACKGROUND OF THE INVENTION

A number of collapsible shelters for mounting on a pickup truck bed have been developed in the prior art.

Many of these shelters have wall and roof elements that are made of flexible fabric that cover support elements in a tent-like fashion, such as those disclosed in U.S. Pat. Nos. 1,477,111; 3,175,857; 3,367,347; 3,466,082; 4,088,363; 4,332,265; 4,566,729; 5,299,849; 5,988,195 and 7,404,590. Other prior art collapsible shelters for mounting on a pickup truck bed have wall elements made of a flexible fabric, and a rigid roof panel, such as those disclosed in U.S. Pat. Nos. 4,294,484; 6,170,502; and 6,604,777. Although fabric is conducive to folding, it does not provide the same level of perceived or actual security against hazards of outdoor environments such as wind, precipitation, or animals.

Some of these shelters have both rigid wall and roof elements, such as those disclosed in U.S. Pat. Nos. 4,807,924, 4,943,108, and 6,439,647. However, these shelters provide limited interior volume as the horizontal foot print of shelter is limited to the area of the pickup truck bed. Further, in the case of the shelter disclosed in U.S. Pat. No. 4,807,924, the shelter has a steeply pitched roof which may be confining for a standing human occupant. In the case of the shelters disclosed in U.S. Pat. Nos. 4,943,108, and 6,439,647, the clamshell-style opening of the combined side walls and roof may be unwieldy for a single user to operate.

Accordingly, there remains a need in the art for a collapsible rigid shelter for mounting on a pickup truck bed that can transform from a transport configuration to a deployed configuration. The transport configuration preferably occupies a compact volume that minimizes adverse impacts on the vehicle's rearward visibility, aerodynamics centre of gravity, and physical footprint. The deployed configuration preferably provides an enclosure that is spacious and well configured for sleeping or standing human occupants. The shelter preferably has a deployment mechanism that is simple to manufacture, stable, robust, and simple to operate by a single user.

SUMMARY OF THE INVENTION

In one aspect, and in general terms, the invention may comprise a collapsible rigid shelter for mounting on a truck bed defining a longitudinal direction and a lateral directions and having two laterally spaced apart elevated side rails, the collapsible rigid shelter being collapsible between a transport configuration and a deployed configuration, the collapsible rigid shelter comprising:

a substantially horizontal floor comprising a pair of floor extensions that are deployable away from each other in laterally opposing directions such that the floor has a greater lateral dimension when the shelter is in the deployed configuration than when in the transport configuration;

a roof shell;

a collapsible roof support attached to the floor and to the roof shell for elevating the roof shell further from the floor when the shelter is in the deployed configuration than when in the transport configuration; and a plurality of rigid wall panels that may be elevated from a substantially horizontal orientation overlapping the floor when the shelter is in the transport configuration, to extend from either the floor or one of the floor extensions to the roof shell, and thereby collectively form an enclosure when the shelter is in the deployed configuration.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 26 depicts an enlarged view of detail B of FIG. 25.

FIG. 27 depicts an enlarged view of detail C of FIG. 25.

DETAILED DESCRIPTION OF THE INVENTION

The present invention relates to a collapsible rigid shelter for mounting on a truck bed.

To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

When describing the present invention, all terms not defined herein have their common art-recognized meanings. For the purposes of this patent application, the following defined terms shall have the following meanings. "Truck bed" means the open cargo hold of a truck. The truck bed defines a "longitudinal direction" substantially collinear with the direction running between the front and rear of the truck, and a "lateral direction" substantially perpendicular to the longitudinal direction of the truck. Without limiting the generality of the foregoing, truck beds include the cargo hold of a pickup truck, as typically characterized by two laterally spaced apart side rails running in the longitudinal direction, a front wall running in the lateral direction, and a rear wall or rear latched door panel running in the lateral direction.

Figure 1:
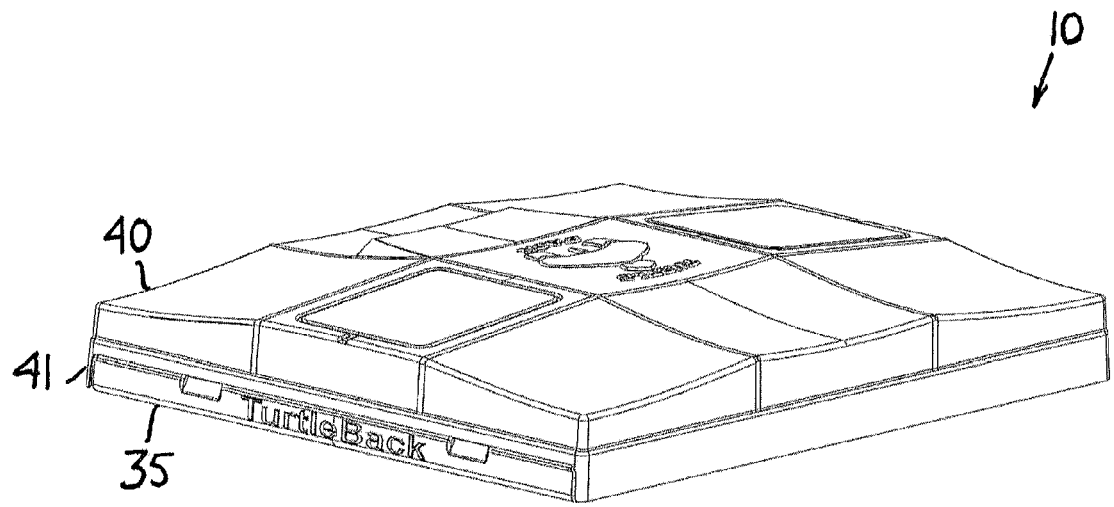
FIGS. 1 and 2 depict a rear perspective view of one embodiment of the shelter of the present invention in the transport configuration and the deployed configuration, respectively.
Figure 2:
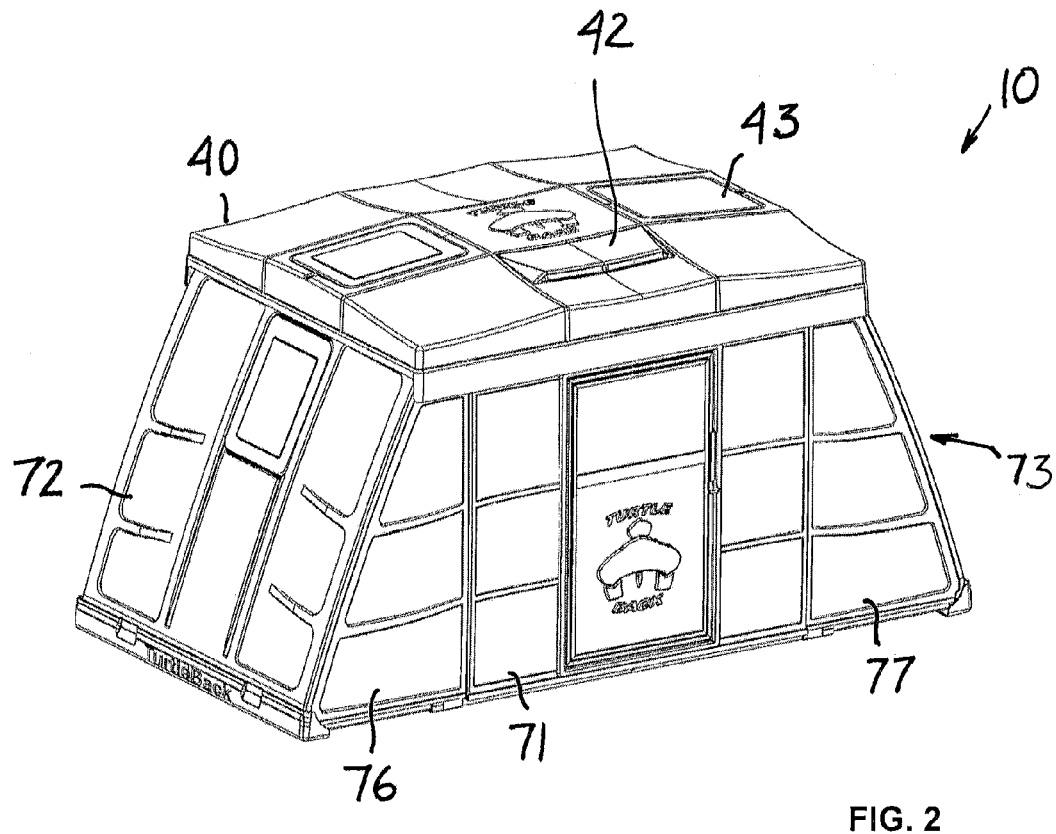

The collapsible rigid shelter (10) of the present invention is collapsible between a transport configuration and a deployed configuration. FIGS. 1 and 2 show the shelter (10) in isolation in the transport and deployed configurations, respectively.

Figure 3:
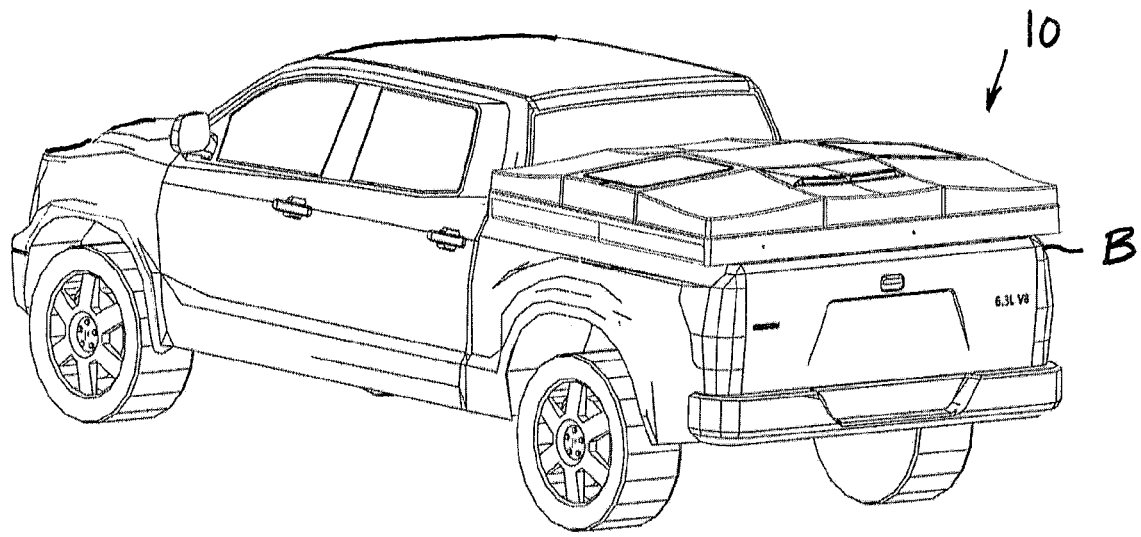
FIGS. 3 and 4 depict a rear perspective view of one embodiment of the shelter of the present invention in the transport configuration and the deployed configuration, respectively, mounted on a pickup truck bed.
Figure 4:
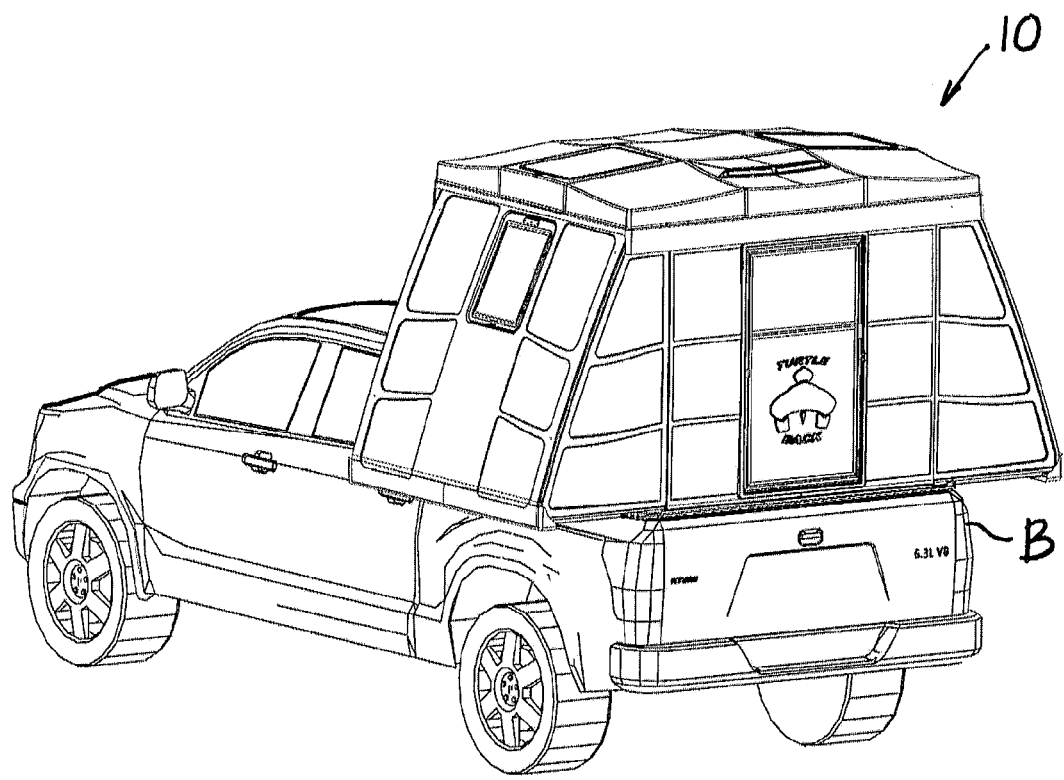

The shelter (10) is intended to be mounted on a truck bed. FIGS. 3 and 4 show the shelter (10) the transport and deployed configurations, respectively, as mounted on a truck bed (B) of a pickup truck. In particular, the shelter (10) may be mounted on top of the side rails. In the transport configuration, the shelter (10) is neatly packaged, occupies a relatively compact volume, substantially within the lateral extents of the pickup truck bed (B), and obscures only part of the rear window of the pickup truck. In the deployed configuration, the shelter (10) provides a relatively spacious enclosure, with portions of the floor cantilevering beyond the lateral extents of the pickup truck bed (B), without the need for any ancillary support.

In general, the shelter (10) generally comprises a substantially horizontal floor (20) having a pair of floor extensions (30), a roof shell (40), a collapsible roof support (50), and a plurality of rigid wall panels (70 to 77).

Figure 5:
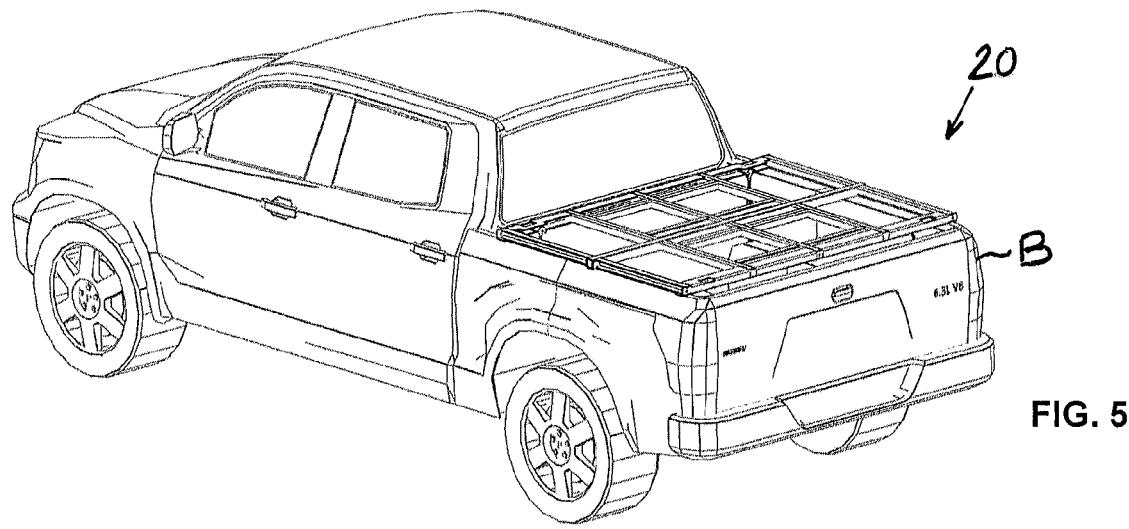
FIG. 5 depicts a perspective view of the floor of one embodiment of the shelter of the present invention, mounted on a pickup truck bed.
Figure 6:
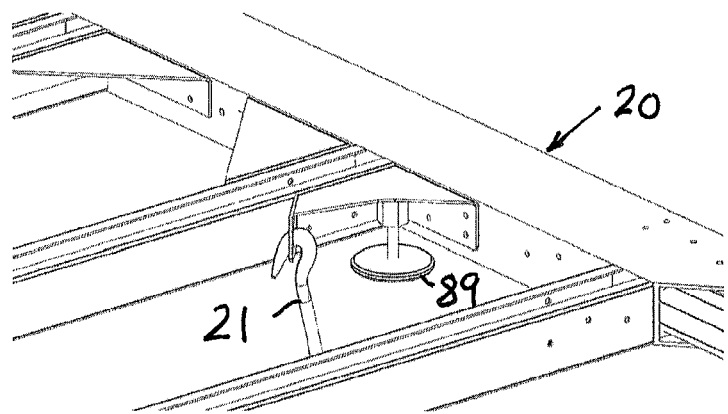
FIG. 6 depicts a perspective view of a vertically adjustable bearing surface attached to the floor of the shelter of the present invention.
Figure 7:
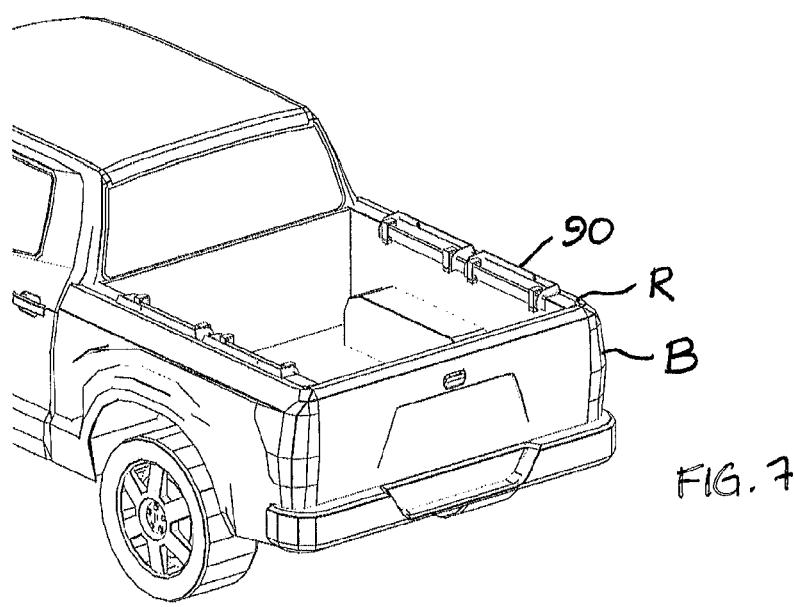
FIG. 7 depicts a perspective view of a bracket clamp assembly for releasably attaching the floor of the shelter of the present invention to a truck bed.

The floor (20) is disposed in a substantially horizontal orientation and provides support for the other components of the shelter (10). In one embodiment shown in FIG. 5, the floor (20) may be releasably secured to the truck bed (B) using any suitable connector known in the art including, without limitation, the connectors described in the following embodiments. In one embodiment shown in FIG. 6, the floor (20) is releasably secured by to the pickup truck bed (B) by turnbuckles (21). A vertically adjustable bearing surface (89) attached to the floor allows the shelter (10) to be leveled even if the truck bed (B) is vertically inclined. In one embodiment shown in FIG. 7, the floor (20) is releasably secured to the pickup truck bed (B) by bracket clamp assemblies (90) attached to the side rails (R).

Figure 8:
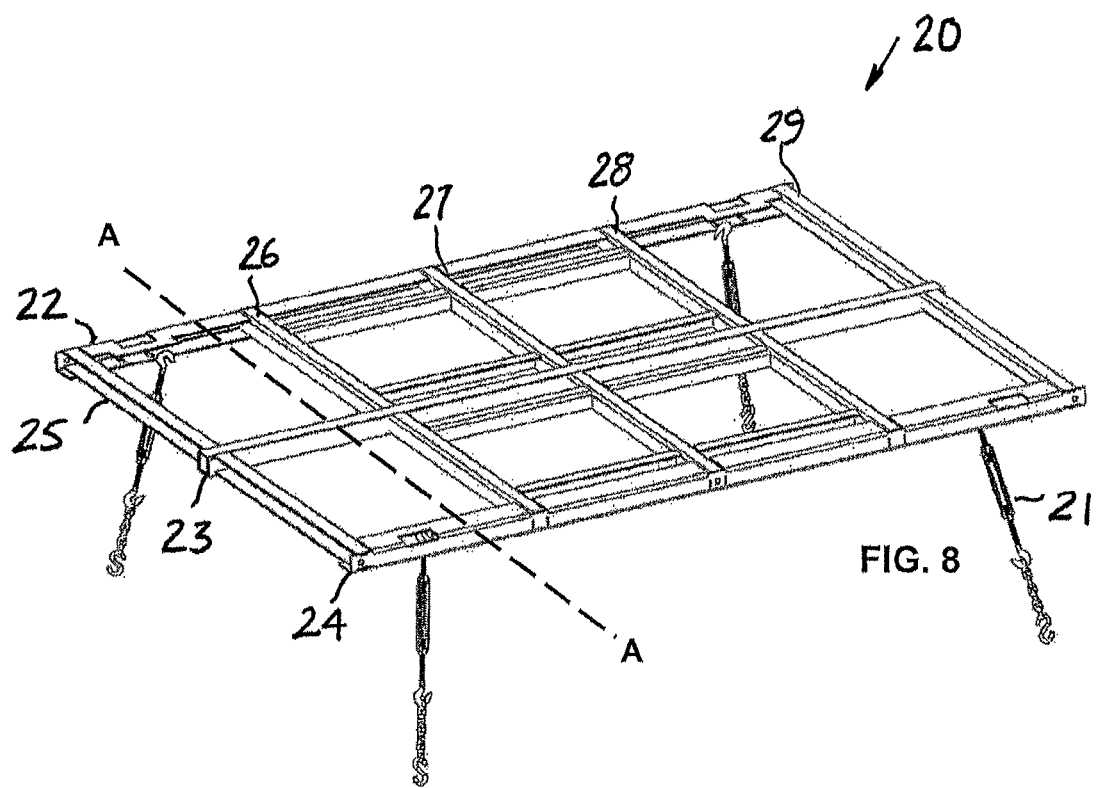
FIG. 8 depicts a perspective view of the floor of one embodiment of the shelter of the present invention.
Figure 9:
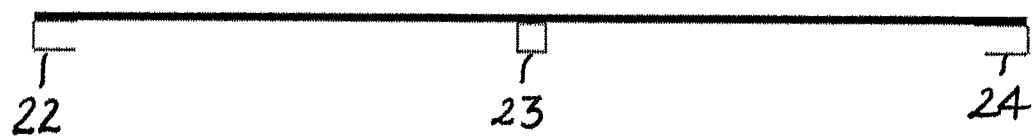
FIG. 9 depicts a sectional view of the floor along line A-A in FIG. 5, of one embodiment of the shelter of the present invention.

In one embodiment shown in FIGS. 8 and 9, the floor (20) is constructed from lateral spanning members (22, 23, 24) rigidly connected to longitudinal spanning members (25, 26, 27, 28 and 29) in a frame configuration, and a floor panel (100). The peripheral lateral spanning members (22, 24) are C-shaped channel members, while the central lateral spanning member (23) is a hollow structural member. The members may be made of any sufficiently strong and rigid material, such as steel, and proportioned so as to withstand anticipated occupancy loads on the floor (20) without undue deformation. The floor panel (100) shown in FIG. 12, horizontally covers the frame members (22 through 29) to provide a support surface for the occupants of the shelter (10). The floor panel (100) may be provided with a selectively closable opening (105) to provide access through the frame members to truck bed (B) below the shelter (10). The planar surface may be constructed of any sufficiently strong, rigid and durable material such as ABS (acrylonitrile butadiene styrene) plastic.

The floor (20) comprises a pair of floor extensions (30) that are slideable away from each other in laterally opposing directions such that the floor (20) has a greater lateral dimension when the shelter is in the deployed configuration than when in the transport configuration. In one embodiment shown in FIGS. 10 and 11, each of the floor extensions (30) is constructed from lateral spanning members (31, 32, 33), a floor extension panel (34), and a cap (35). The lateral spanning members (31, 32, 33) are I-beams that are connected together and made of any sufficiently strong and rigid material, such as steel, and proportioned so as to withstand anticipated occupancy loads on the floor extension (30) without undue deformation. The floor extension panel (34) covers the members (31, 32, 33) to provide an extended support surface for the occupants of the shelter (10). The floor extension panel (34) may be constructed of any sufficiently strong, rigid and durable material such as ABS plastic. The extension cap (35) is attached at the outside ends of the lateral spanning members (31, 32, 33). As shown in FIG. 1, when the shelter (10) is in the transport configuration, the cap (35) abuts with the vertical flange (41) of the roof shell (40) to conceal the remainder of the floor extension (30). The cap (35) incorporates a handle (36) for the user to apply a lateral pulling force to the floor extension (30). The cap (35) may be constructed of any sufficiently strong, rigid and durable material such as ABS plastic.

Figure 10:
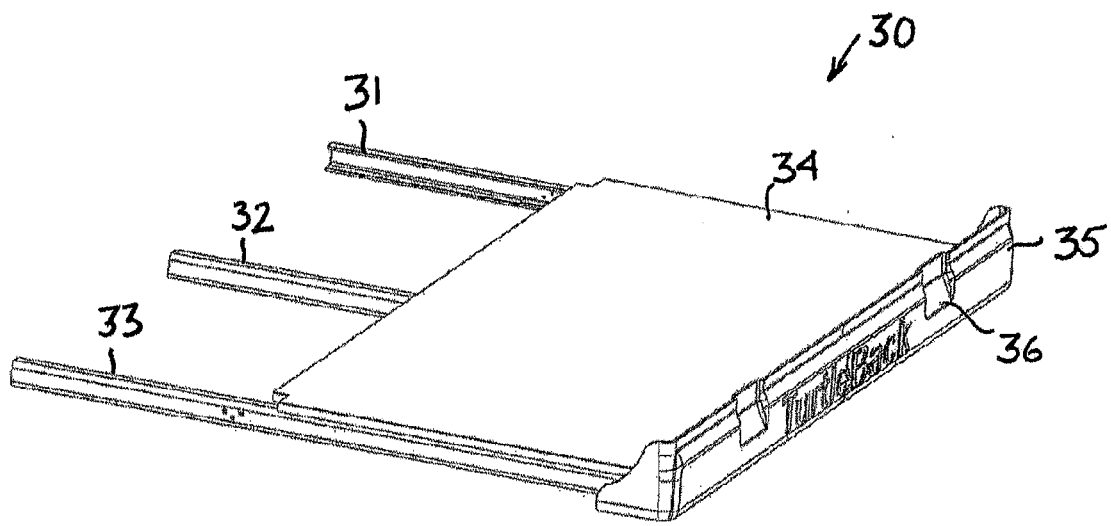
FIGS. 10 and 11 depict a top and bottom perspective view of a floor extension of one embodiment of the shelter of the present invention.
Figure 11:
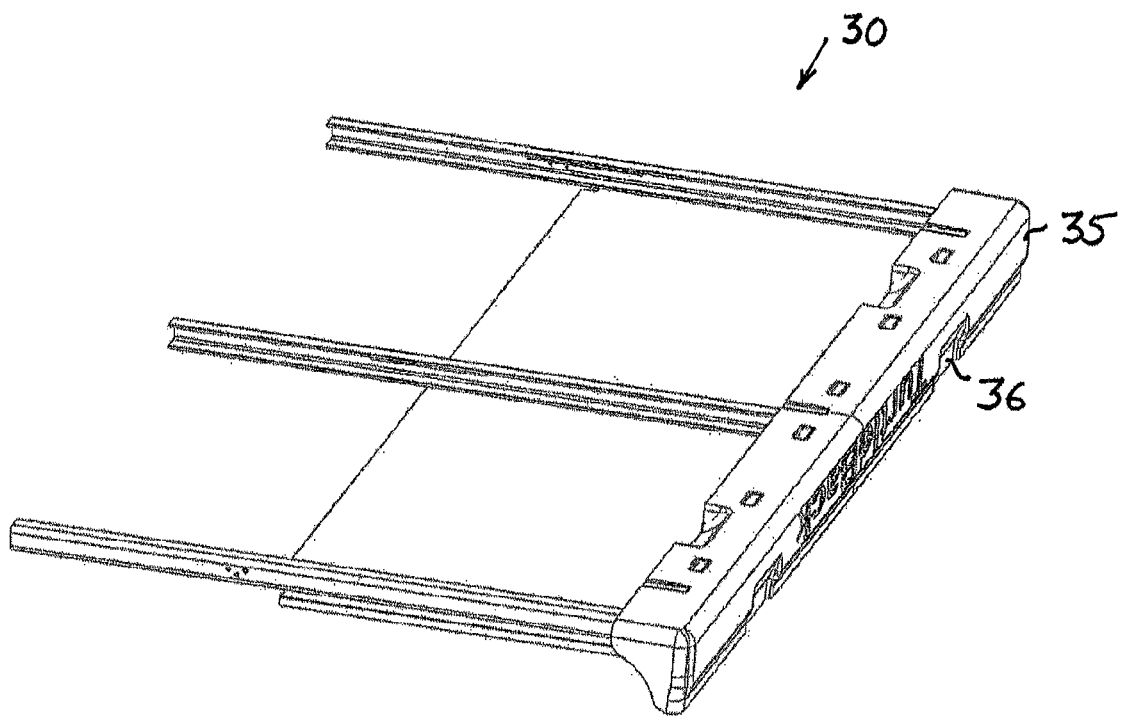
Figure 12:
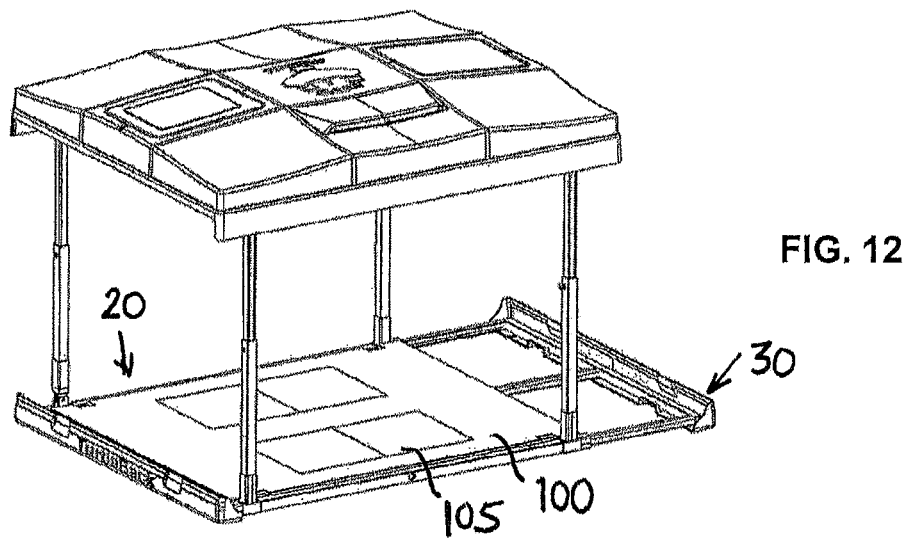
FIGS. 12 through 14 depict perspective views of various stages of deployment of the floor extensions of one embodiment of the shelter of the present invention.
Figure 13:
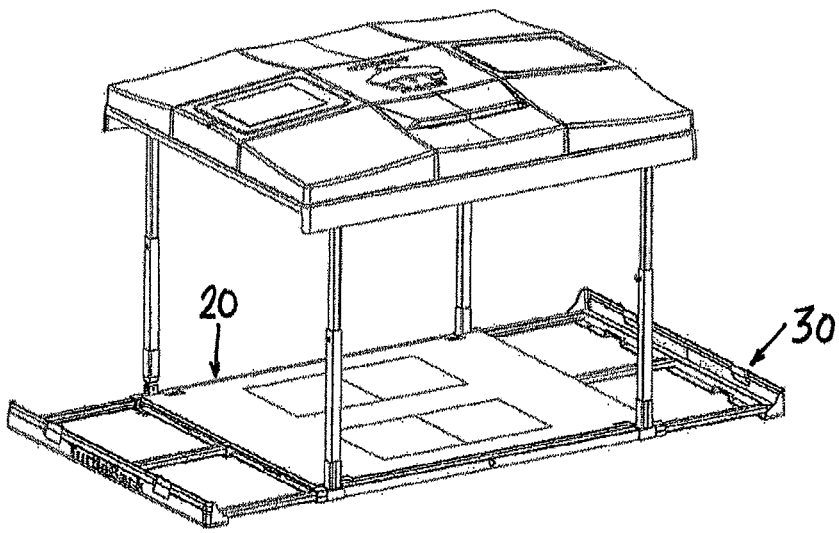

The laterally sliding relationship between the floor (20) and the floor extensions (30) may be implemented by any suitable connection known in the art including, without limitation, the connections described in the following embodiments. In one embodiment, the lateral spanning member (31, 32, 33) of the floor extension (30) shown in FIGS. 10 and 11 are slideably received on tracks formed by the channel of the peripheral lateral spanning members (22, 24) or the hollow section of the central lateral spanning member (23) shown in FIGS. 8 and 9. FIGS. 12 and 13 depict the sliding relationship between the floor extensions (20) and the floor (30). In one embodiment not shown, the tracks may be formed using a slide wheel and guide track system, or a T-bar and guide track system.

Figure 14:
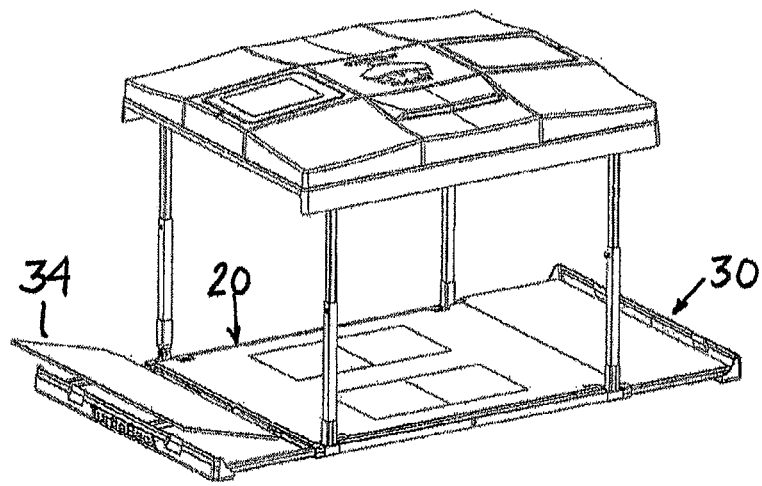
Figure 15:
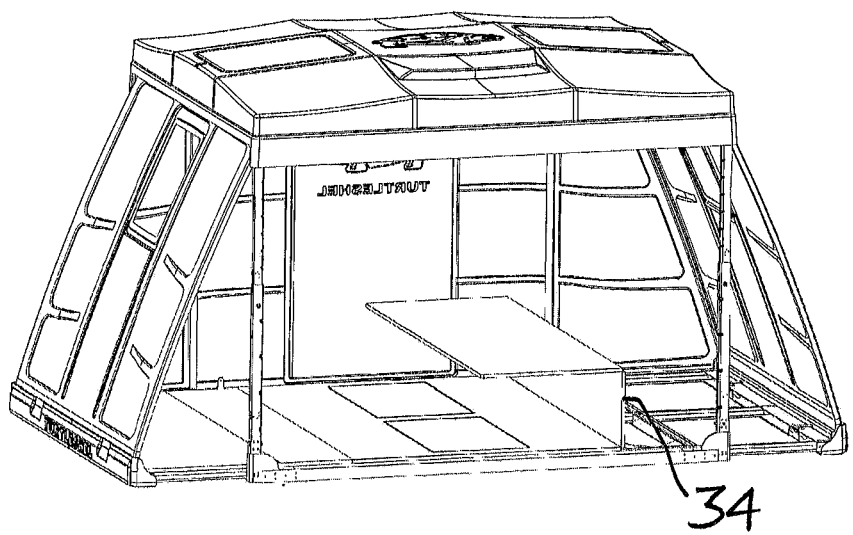
FIGS. 15 to 17 depict perspective views of various stages of the deployment of the floor extension panels of one embodiment of the shelter of the present invention.
Figure 16:
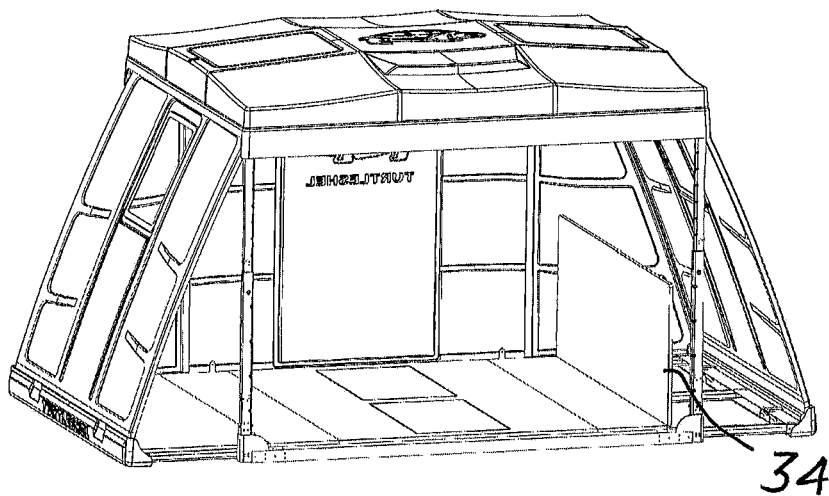
Figure 17:
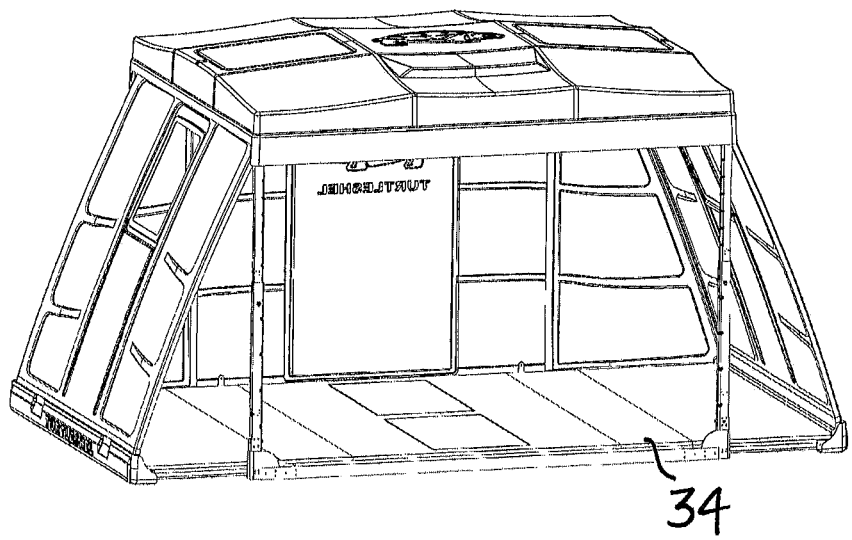

In one embodiment as shown in FIG. 14, the floor extension panel (34) may be a detached panel that is placed onto the floor extension panel (30) after it is moved laterally away from the floor (20). In one embodiment shown in FIGS. 15 to 17, the floor extension panel (34) comprises a plurality of hingedly connected panels, one of which is hingedly connected to the floor panel (100). The floor extension panels (34) overlap the floor panel (100) and can be folded laterally away from the floor panel (100) to overlap the floor extension (30).

The roof shell (40) provides the upper most part of the shelter (10). In one embodiment shown in FIGS. 1 and 2, the roof shell (40) comprises a monolithic shell with a slightly domed profile that covers the wall panels when the shelter (10) is in the transport configuration. The roof shell may be provided with vertical flanges (41) which provide a mounting surface for parts of the collapsible roof support (50) will be further described below. The roof shell may have selectively closable openings such as a roof vent (42) or roof flaps (43) to enhance air circulation and illumination of the interior of the shelter (10). The roof shell (40) may be made of any sufficiently strong, rigid and durable material such as ABS plastic, fibre-reinforced plastic (FRP), or fibreglass. The selected material is preferably light in weight to enhance the ease with which the roof shell (40) may be elevated.

The collapsible roof support (50) is attached to the roof shell (40) and the floor (20), and serves to elevate the roof shell (40) further from the floor (20) when the shelter (10) is in the deployed configuration than when in the transport configuration. As used herein to describe the roof support, term "collapsible" means that the roof support can assume a configuration that is more vertically compact when the shelter is in the transport configuration than when the shelter is in the deployed configuration. As explained below, in some embodiments, the roof support is made collapsible by components that are selectively moveable in relation to each other, while in other embodiments, the roof support may be made collapsible by elements that can be selectively assembled and disassembled with respect to the other parts of the shelter (10). The collapsible roof support (50) may be implemented by any suitable structure known in the art, including those described in the following embodiments.

Figure 18:
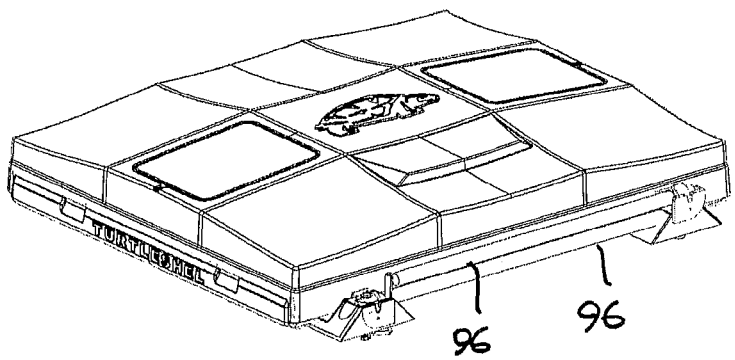
FIGS. 18 to 20 depict perspective views of various stages of the deployment of the collapsible roof support of one embodiment of the shelter of the present invention.
Figure 19:
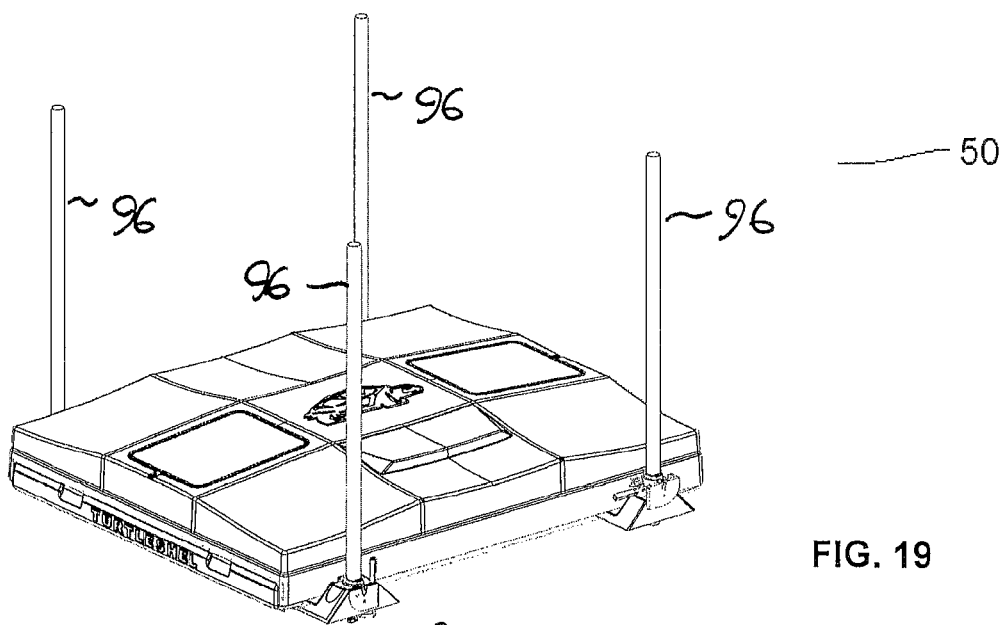
Figure 20:
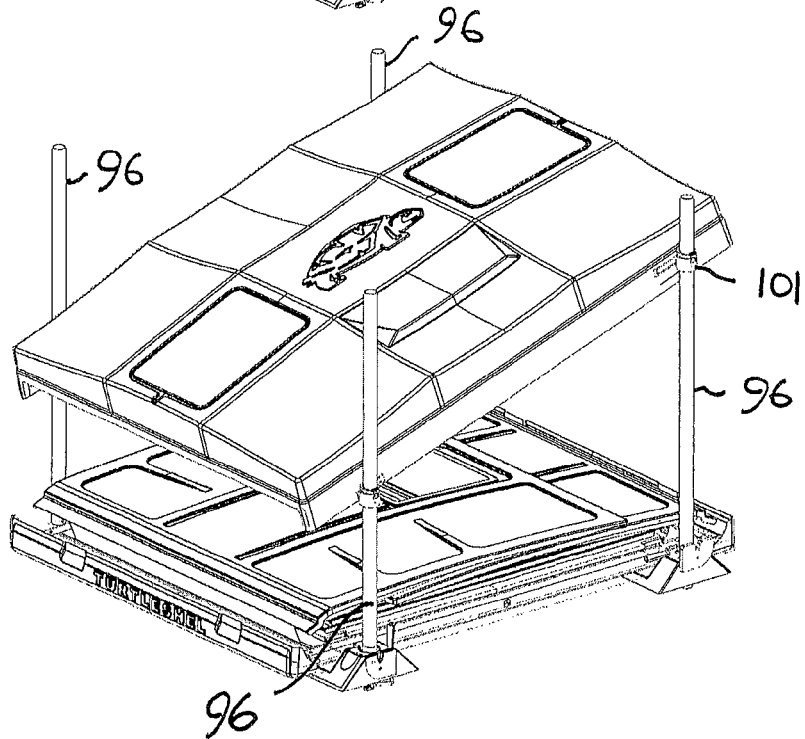

In one embodiment shown in FIGS. 18 to 20, the collapsible roof support (50) comprises a plurality of poles (36) that are pivotally attached at their bases to the floor (20) to allow the poles (96) to be pivoted from a substantially horizontal orientation to a substantially vertical orientation. The roof shell (40) is also pivotally attached to each of the poles (96) by collars (101) that slide over the poles (96). Once the poles (96) are vertically oriented, the roof shell (40) may be elevated by sliding the collars (101) upwards along the poles (96) and secured in place. The roof shell (40) may be raised on the poles (96) either manually or assisted by a winch, cable, and pulley system (not shown).

Figure 21:
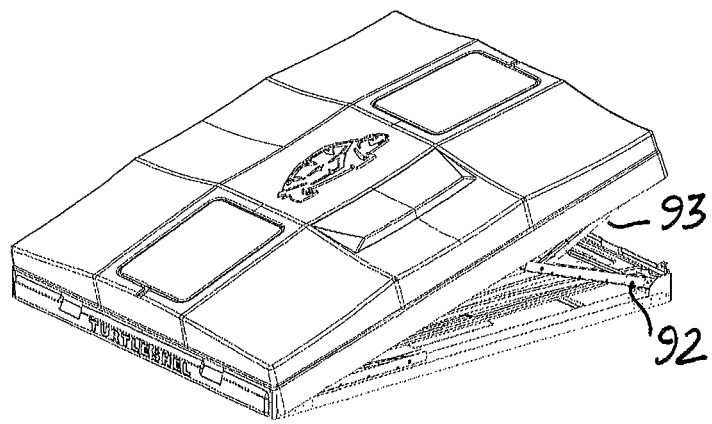
FIGS. 21 to 24 depict perspective views of various stages of the deployment of the collapsible roof support of one embodiment of the shelter of the present invention.
Figure 22:
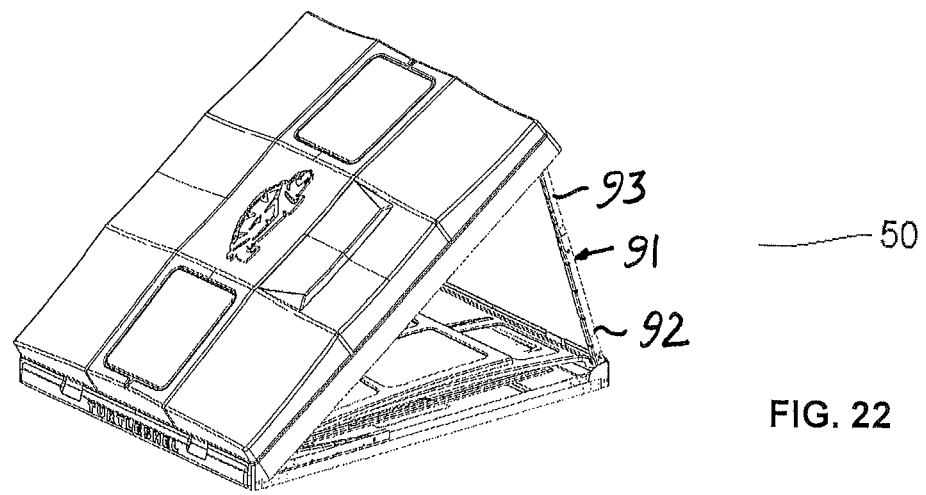
Figure 23:
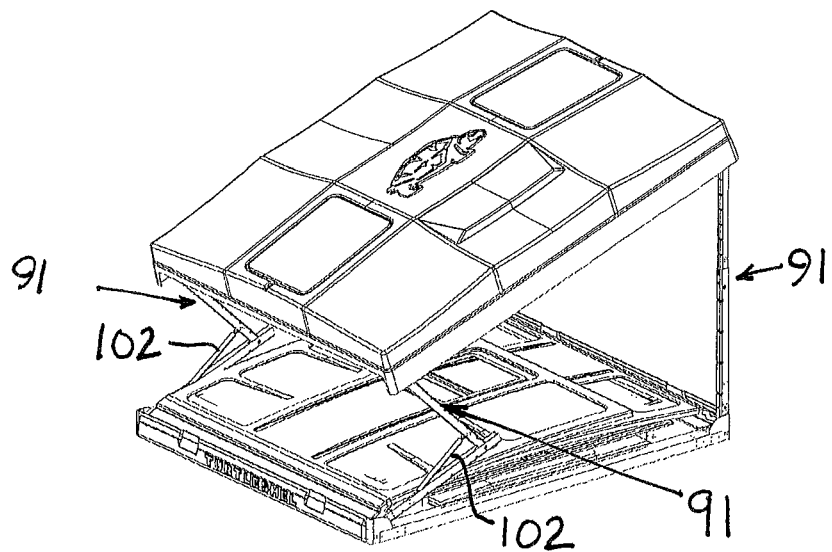
Figure 24:
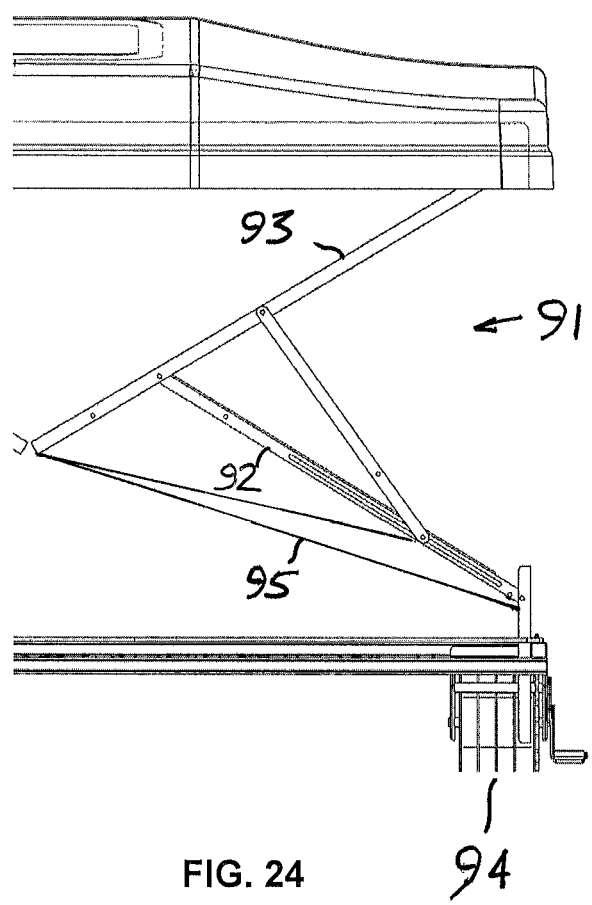

In one embodiment shown in FIGS. 21 to 23, the collapsible roof support (50) comprises a plurality of poles (91) having a plurality of pivotally attached segments (92, 93), that allow the segments to be unfolded from a substantially horizontal orientation to a substantially vertical orientation. The unfolding of the segments (92) may be performed either manually, or assisted by a hydraulic strut (102) as shown in FIGS. 21 and 23, or by a winch (94) and cable (95) system as shown in FIG. 24.

Figure 25:
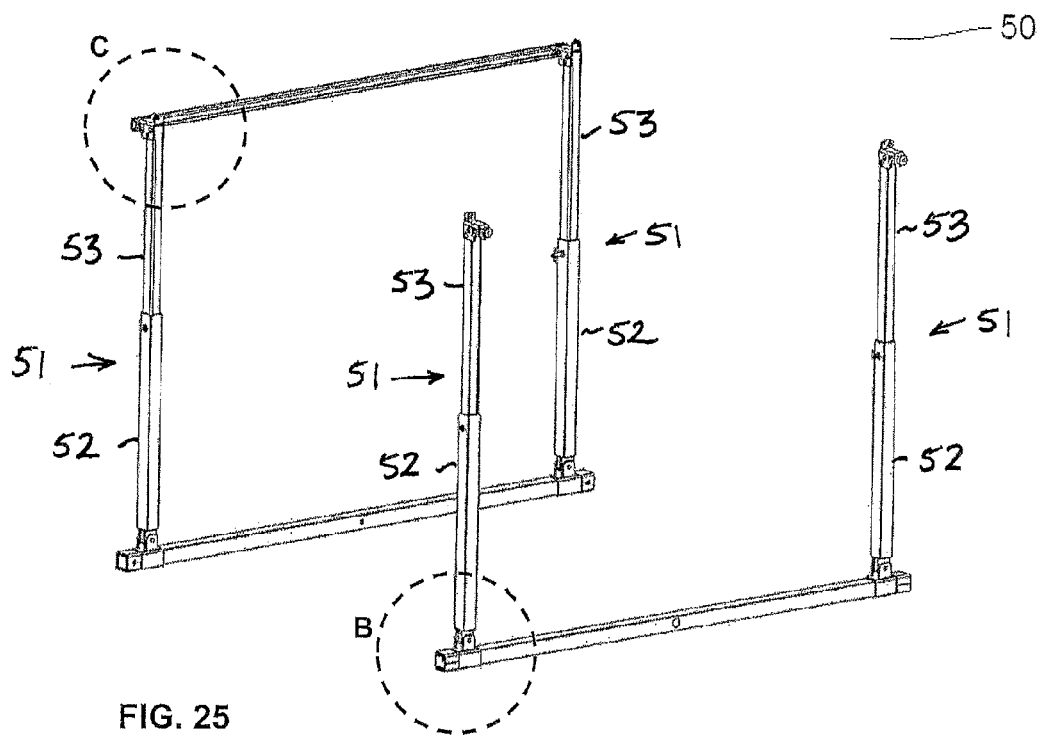
FIG. 25 to 27 depicts a perspective view of the collapsible roof support of one embodiment of the shelter of the present invention.
Figure 26:
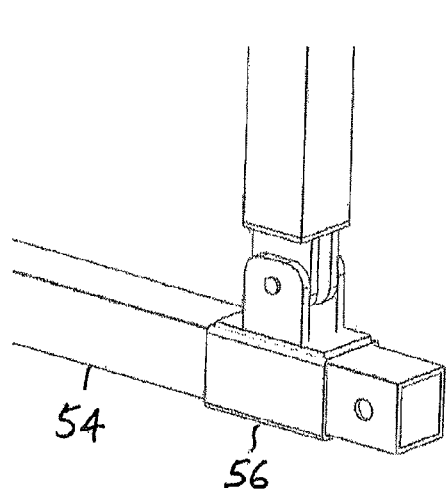
Figure 27:
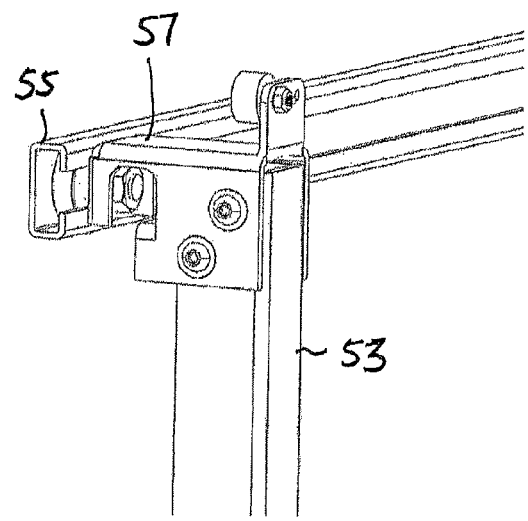
Figure 28:
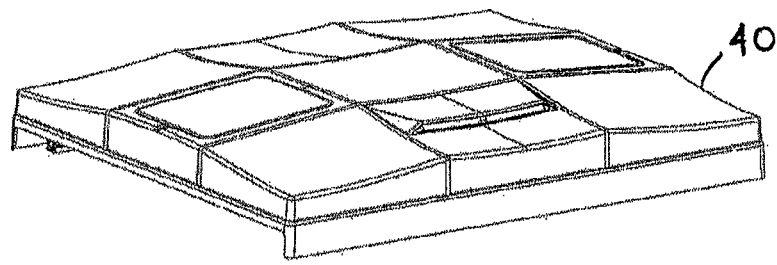
FIGS. 28 through 33 depict perspective views of various stages of deployment of the collapsible roof support shown in FIGS. 25 to 27 of one embodiment the shelter of the present invention.

In on embodiment shown in FIGS. 25 to 27, the collapsible roof support (50) comprises extendable poles (51), each comprising a plurality segments (52, 53) attached in telescopically sliding relation to each other. A floor track (54) is attached to the floor (20), a roof track (55) is attached to the flange (41) of the roof shell (40), a floor slider (56) is pivotally attached to the extendable pole (53) and slideably attached to the floor track (54), and a roof slider (57) is pivotally attached to the extendable pole (53) and slideably attached to the roof track (55). As shown in FIGS. 28 to 33, the collapsible roof support (50) elevates the roof shell (40) by cooperative sliding of the floor sliders (56) along the floor track (54), sliding of the roof sliders (57) along the roof track (55), and rotation and telescopic extension of the extendable poles (51).

Figure 34:
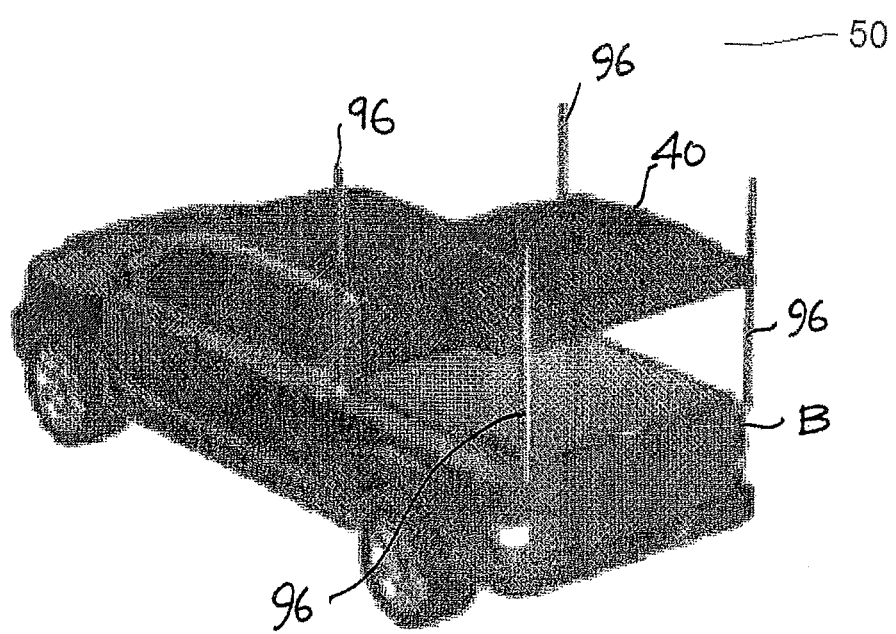
FIG. 34 depicts a perspective view of the collapsible roof support of one embodiment of the shelter of the present invention

In one embodiment shown in FIG. 34, the collapsible roof support (50) comprises a plurality of poles (96) releasably securable in a vertical orientation position to the floor (20). Each pole (96) may be provided with threads at its base for screwing into a complementarily threaded aperture defined in the floor (20). The roof shell (40) may be raised on the poles (96) either manually or assisted by a winch, cable, and pulley system (not shown).

In other embodiments not shown, the collapsible roof support (50) may comprise poles that fold in a scissor like fashion.

The rigid wall panels (70 to 77) are disposed in a substantially horizontal fashion overlapping the floor (20) when the shelter (10) is in the transport configuration, and collectively form an enclosure extending from the floor (20). The wall panels (70 to 77) can be elevated to extend from either the floor or one of the floor extensions to the roof shell so as to collectively form an enclosure when the shelter (10) is in the deployed configuration. The rigid wall panels (70 to 77) may be made of any sufficiently strong, rigid and durable material such as ABS plastic, fibre-reinforced plastic (FRP), or fibreglass. The selected material is preferably light-weight to enhance the ease with which the rigid wall panels (70 to 77) may be elevated.

Figure 29:
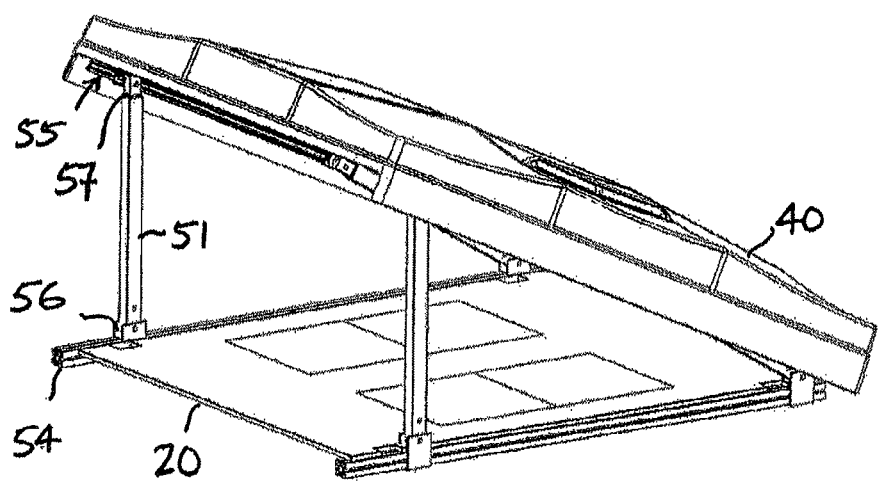
Figure 30:
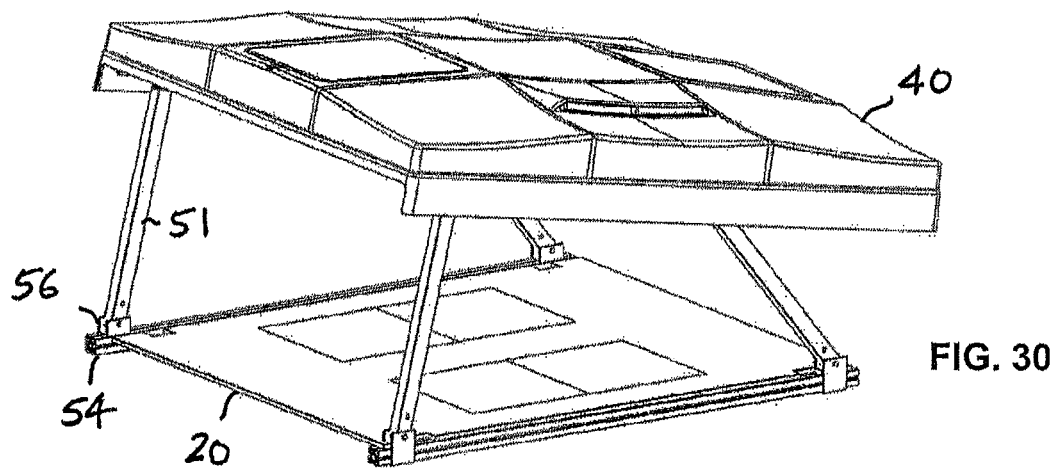
Figure 31:
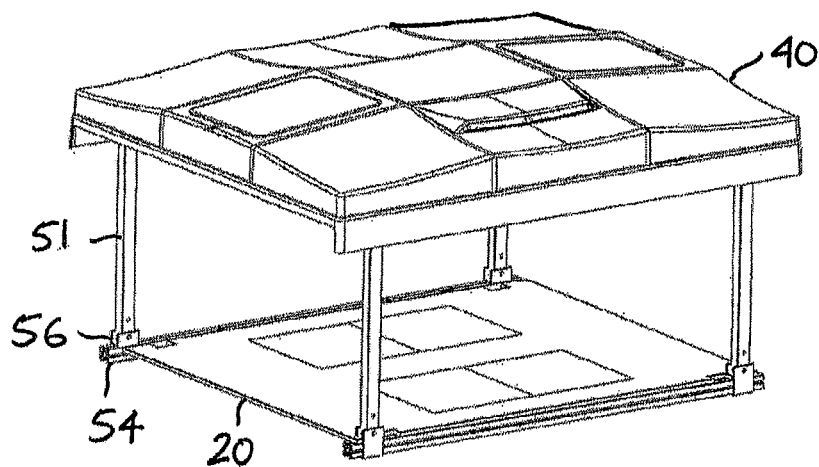
Figure 32:
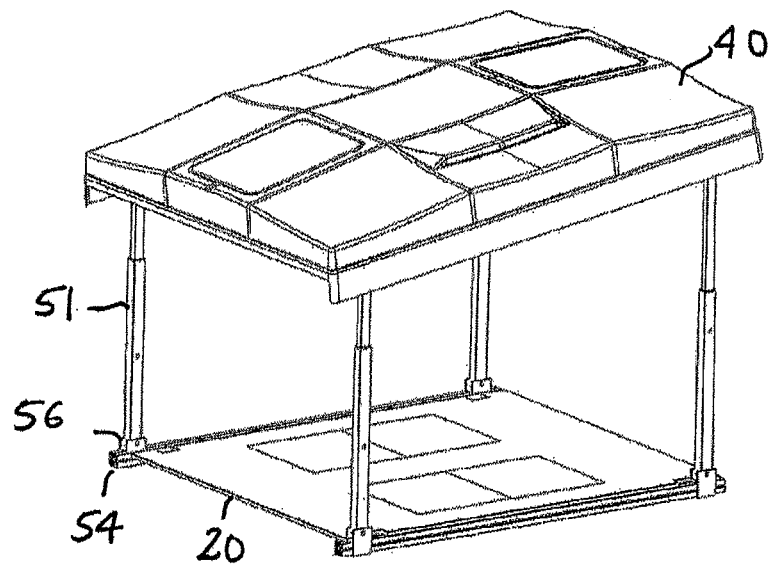
Figure 33:
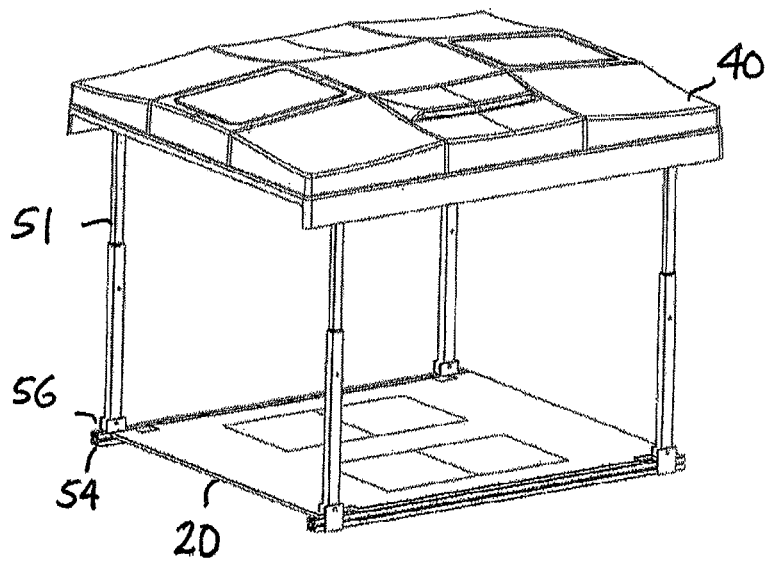
Figure 36:
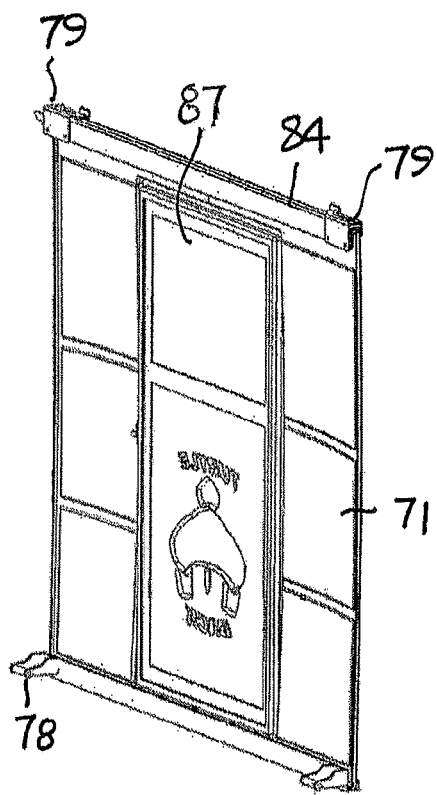
Figure 37:
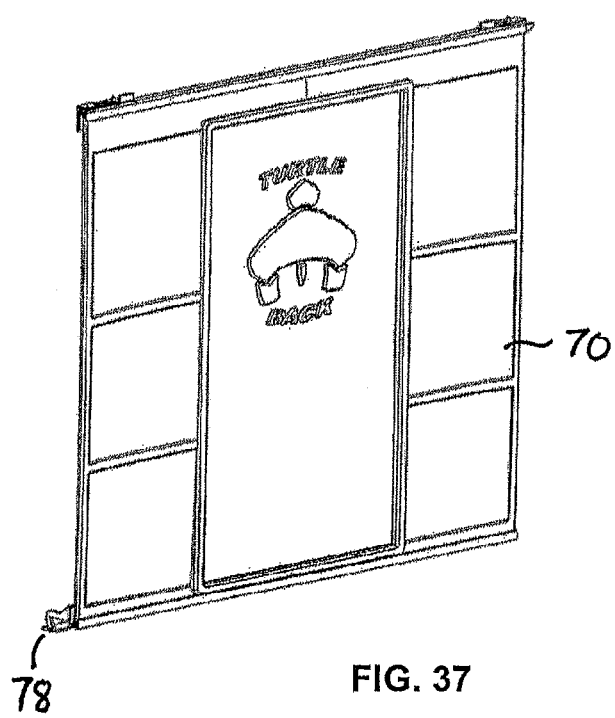
FIG. 37 depicts a front perspective view of the front panel of one embodiment of the shelter of the present invention.
Figure 38:
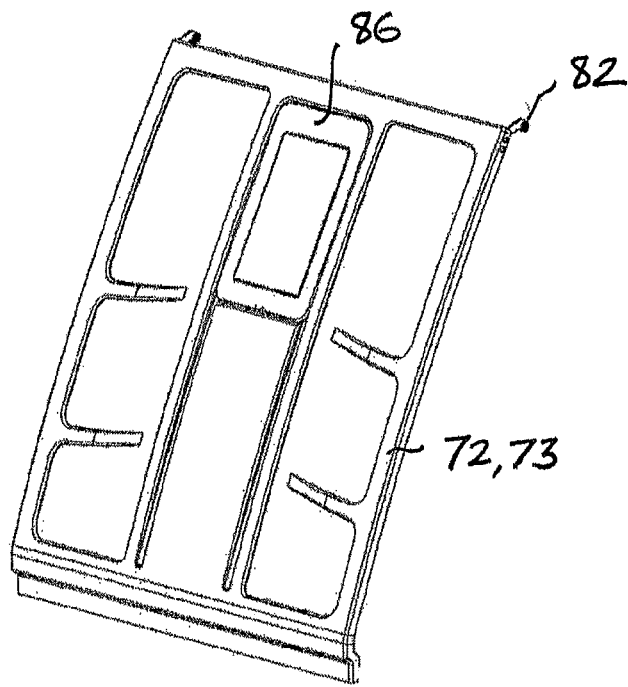
FIG. 38 depicts an exterior perspective view of the side panel of one embodiment of the shelter of the present invention.

In one embodiment shown in FIG. 2 and FIGS. 35 to 39, the plurality of rigid wall panels (70 to 77) comprises a front panel (70), a rear panel (71), a pair of side panels (72, 73), a pair of front extension panels (74, 75), and a pair of rear extension panels (76, 77). FIG. 38 shows one of the side panels (72), which is the same as the other side panel (73) on the laterally opposite side of the shelter (10). FIG. 29 shows one of the rear extension panels (77), which is symmetric with the other rear extension panel (76), which are the same as the front extension panels (74 and 75), respectively.

Figure 35:
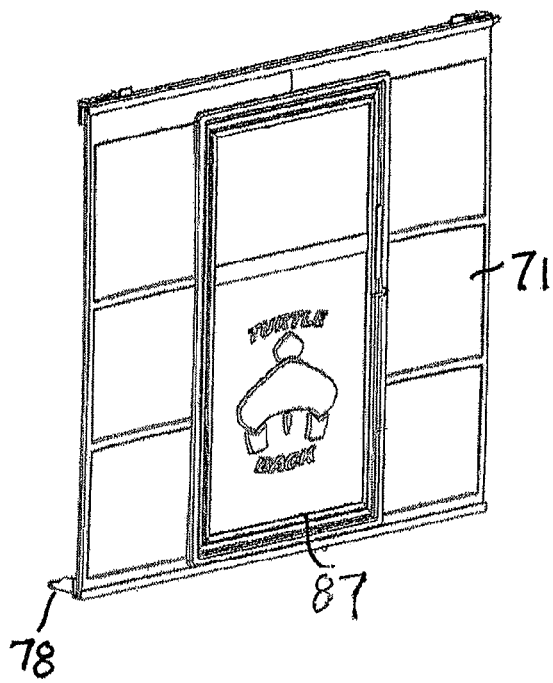
FIGS. 35 and 36 depict a rear and front perspective view, respectively, of the rear panel of one embodiment of the shelter of the present invention.
Figure 43:
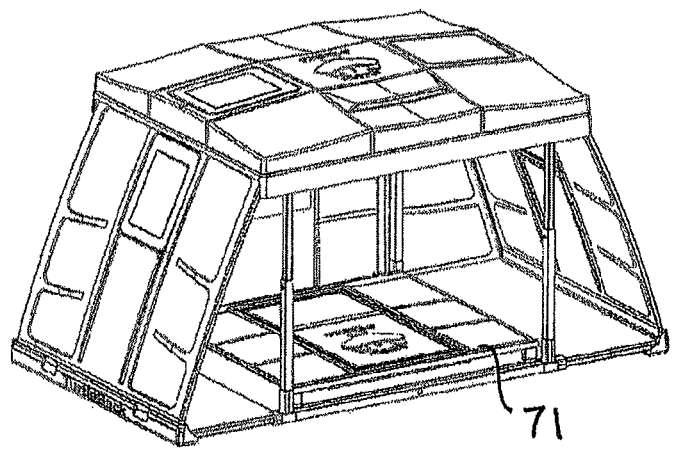
Figure 44:
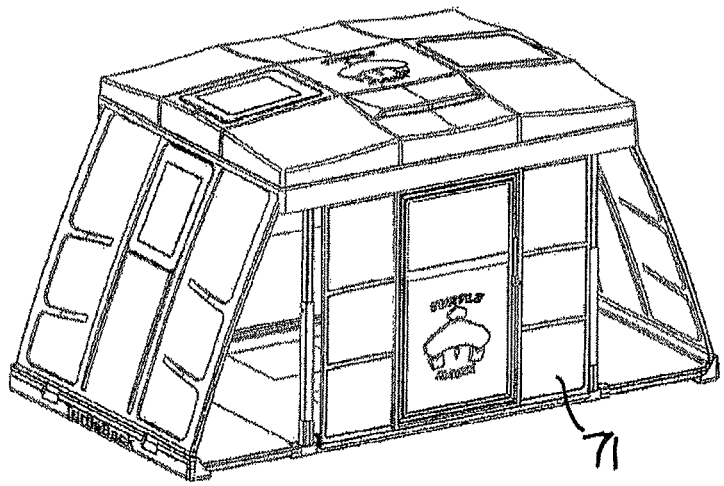
Figure 45:
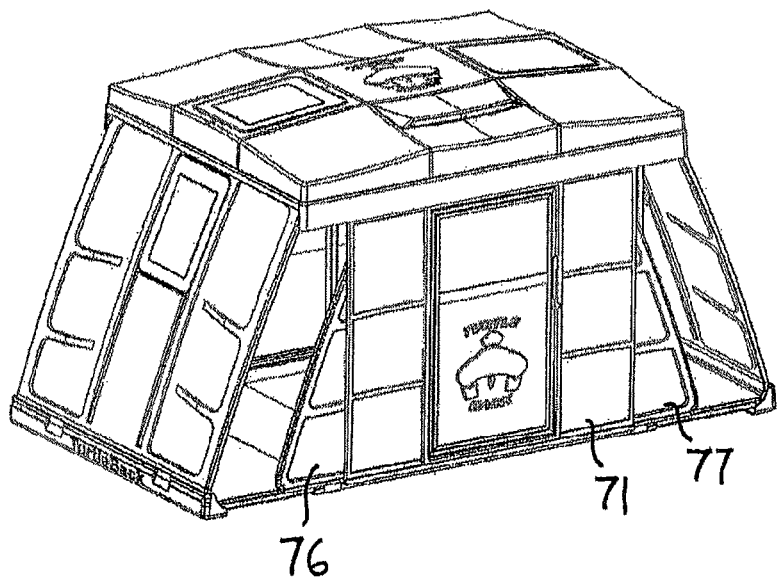

In one embodiment as shown in FIGS. 35 through 37, each of the front panel (70) and rear panel (71) are provided with roller hinges (78) that pivotally attach them to the floor (20). As shown in FIGS. 43 through 45, when the roof shell (40) is elevated, the rear panel (71) may be pivoted upwardly about a lateral axis from a substantially horizontal position to a more vertical position extending from the floor (20) to the elevated roof shell (40). The rear panel (71) may be provided with a variety of apertures and accessories such as a hinged door (87) as shown in FIGS. 35 and 36, for accessing the shelter from the rear of the truck. It will be understood that the front panel (70) is analogous in structure and operation. The front panel (70) may be provided with a variety of apertures and accessories such as a window for access to the cab of the truck.

Figure 40:
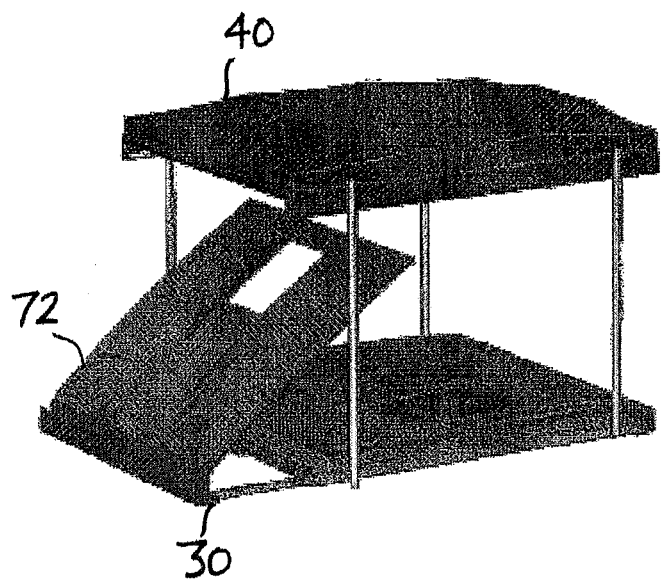
FIG. 40 through 45 depict perspective views of various stages of deployment of the wall panels of one embodiment of the shelter of the present invention.
Figure 41:
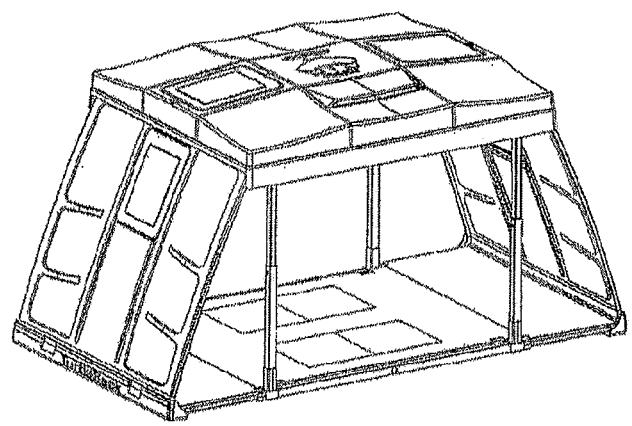

In one embodiment shown in FIG. 38, the side panels (72, 73) are slideably and rotatably attached to roof shell (40). The slideable and rotatable attachment between the side panels (72, 73) and the roof shell (40) may be implemented using any suitable connectors known in the art including, without limitation, a roller slider (82) mounted within a guide track system connected to the interior surfaces of the flanges (41) of the roof shell (40). When the roof shell (40) is elevated, the side panels (72, 73) may slide in laterally opposed directions away from the roof shell (40) and pivot downwards about a longitudinal axis from a substantially horizontal orientation to a more vertical orientation extending from one of the extended floor extensions (30) to the elevated roof shell (40) as shown in FIG. 41. The side panels (72, 73) may be provided with a variety of apertures and accessories such as a strap-secured awning-style window (86) shown to enhance air circulation to and illumination of the interior of the shelter (10) as shown in FIG. 38. In one embodiment shown in FIG. 40, the side panels (72, 73) are pivotally attached to opposing floor extensions (30) to pivot upwards about a longitudinal axis from a substantially horizontal orientation to a more vertical orientation extending from one of the floor extensions (30) to the elevated roof shell (40).

Figure 39:
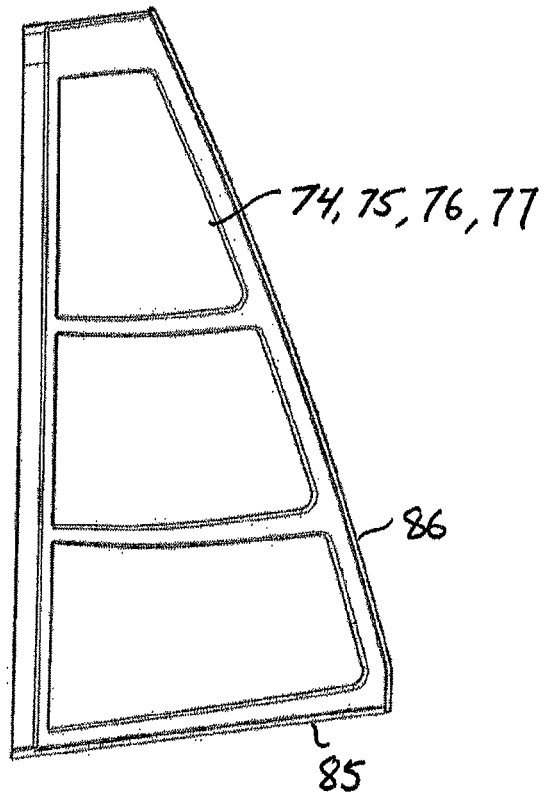
FIG. 39 depicts an exterior perspective view of an extension panel of one embodiment of the shelter of the present invention.
Figure 42:
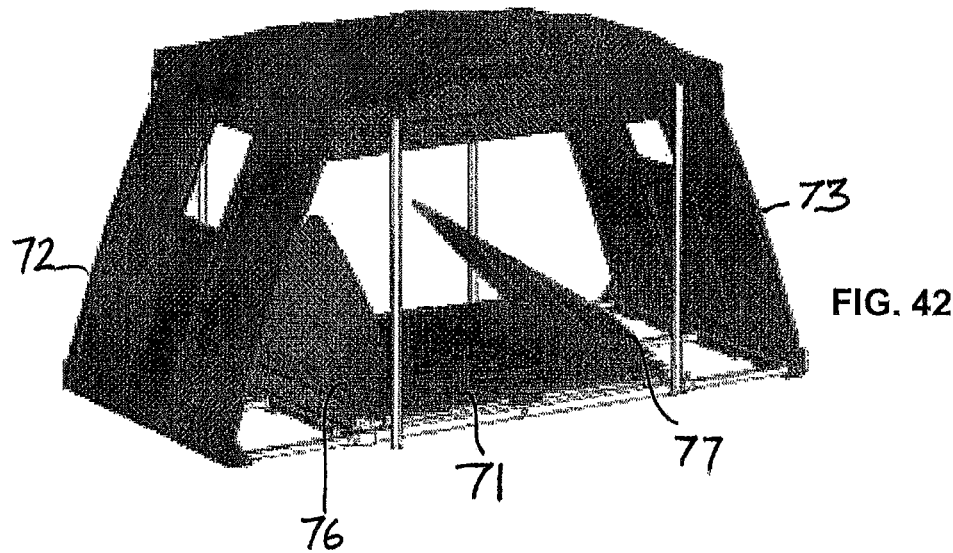

In one embodiment shown in FIG. 39, the extension panel (74, 75, 76, and 77) is substantially triangular shaped to occupy the space defined between the rear panel (71), the inclined side panel (72, 73), the floor extension (30) and the roof shell (40). The extension panel (77) may be provided with an edge trim (85) and peripheral seal (86) to form a wind-tight and water-tight seal with the floor extension (30) and the side panel (72, 73) respectively. In one embodiment as shown in FIG. 42, the rear extension panels (76, 77) are attached to the rear panel (71) so that they pivot upwardly with the rear panel (71) as the rear panel (71) is pivoted into a substantially vertical orientation. The rear extension panels (76, 77) are hingedly attached to the rear panel (71) so that when the rear panel (71) is in the vertical orientation, the rear extension panels (76, 77) may be pivoted about a vertical axis so as to abut one of the side panel (72, 73). In one embodiment shown in FIG. 45, the rear extension panel (77) is slideably attached to the rear panel (71) by brackets (79) attached to the rear extension panel (77) and which run on a track (84) attached to the rear panel (71) as shown in FIG. 36, or a slide wheel and corresponding guide track system, or a T-bar and corresponding guide track system. When the rear panel (71) is elevated, the rear extension panel (77) may slide laterally away from the rear panel (71). The structure and operation of the front extension panels (74, 75) in relation to the front panel (70) are analogous in structure and operation to the structure and operation of the rear extension panels (76, 77) in relation to the rear panel (71) as described above.

Once the various parts of the shelter (10) have been moved into the deployed configuration of the shelter (10), they may be releasably secured in place using any suitable connectors or mechanisms known in the art. By way of non-limiting examples, the floor (20) and floor extension may be releasably secured by a retractable pin that extends through aligning apertures defined in one of the members (31, 32, 33) of the floor extension (30) and one of the members (22, 23, 24) of the floor (20). The wall panels (70 to 77) may be releasably secured to the floor (20), the floor extensions (30), the roof shell (40) or a combination of the foregoing with a magnetic lock, a turn lock, or friction fit mechanism. To collapse the shelter (10), the movements of the various components of the shelter (10) as described above are performed in reverse order.

As will be apparent to those skilled in the art, various modifications, adaptations and variations of the foregoing specific disclosure can be made without departing from the scope of the invention claimed herein.

What is claimed is:

1. A collapsible rigid shelter for mounting on a truck bed defining a longitudinal direction and a lateral directions and having two laterally spaced apart elevated side rails, the collapsible rigid shelter being collapsible between a transport configuration and a deployed configuration, the collapsible rigid shelter comprising:

(a) a substantially horizontal floor comprising a pair of floor extensions that are deployable away from each other in laterally opposing directions such that the substantially horizontal floor has a greater lateral dimension when the collapsible rigid shelter is in the deployed configuration than when in the transport configuration;

(b) a roof shell;

(c) a collapsible roof support attached to the substantially horizontal floor and to the roof shell for elevating the roof shell further from the substantially horizontal floor when the collapsible rigid shelter is in the deployed configuration than when in the transport configuration; and (d) an enclosure comprising a plurality of rigid wall panels that may be elevated from a substantially horizontal orientation overlapping the substantially horizontal floor when the collapsible rigid shelter is in the transport configuration, to extend from either the substantially horizontal floor or one of the floor extensions to the roof shell when the collapsible rigid shelter is in the deployed configuration;

the plurality of rigid wall panels comprising a front panel and a rear panel, each being pivotally attached to the substantially horizontal floor; a pair of side panels, each being pivotally attached to one of the floor extensions; a pair of front extension panels, each being slideably or pivotally attached to the front panel; and a pair of rear extension panels, each being slideably or pivotally attached to the rear panel.

2. The shelter of claim 1 wherein the floor extensions are laterally slideable within a track comprising a channel or a hollow section of a lateral spanning member.

3. The shelter of claim 1 wherein the substantially horizontal floor further comprises a floor panel with a hingedly connected floor extension panel that overlaps the floor panel when the shelter is in the transport configuration, and that unfolds to overlap one of the floor extensions when the shelter is in the deployed configuration.

4. The shelter of claim 1 wherein the roof shell is shaped to enclose the plurality of wall panels when the shelter is in the transport configuration.

5. The shelter of claim 1 wherein the roof support comprises a pole pivotally attached to the substantially horizontal floor, and pivotally and slideably attached to the roof shell.

6. The shelter of claim 1 wherein the roof support comprises a pole comprising a plurality of pivotally connected segments.

7. The shelter of claim 1 wherein the plurality of rigid wall panels comprises:

(a) the front panel pivotally attached to the substantially horizontal floor for pivoting about a lateral axis;

(b) the rear panel pivotally attached to the substantially horizontal floor for pivoting about a lateral axis;

(c) the pair of side panels, wherein each of the side panels is pivotally attached to a different one of the floor extensions for pivoting about a longitudinal axis;

(d) the pair of front extension panels, wherein each of the front extension panels is either slideably attached to the front panel for sliding in laterally opposed directions away from the front panel into abutting relation with a different one of the side panels, or pivotally attached to the front panel for pivoting about a substantially vertical axis into abutting relation with a different one of the side panels; and (e) the pair of rear extension panels, wherein each of the rear extension panels is either slideably attached to the rear panel for sliding in laterally opposed directions away from the rear panel into abutting relation with a different one of the side panels, or pivotally attached to the rear panel for pivoting about a substantially vertical axis into abutting relation with a different one of the side panels.

* * * * *